United States Patent
Daga et al.

(10) Patent No.: US 12,309,133 B2
(45) Date of Patent: May 20, 2025

(54) INTEGRATING DATA ACCESS AMONG DISPARATE PLATFORMS OVER A CLOUD STORAGE SCHEME

(71) Applicant: Schlumberger Technology Corporation, Sugar Land, TX (US)

(72) Inventors: Swapnil Suwalal Daga, Tathwade (IN); Vijay Kumar, Pune (IN); Zhengang Lu, Katy, TX (US); Jason Wang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/539,757

(22) Filed: Dec. 14, 2023

(65) Prior Publication Data

US 2024/0205213 A1    Jun. 20, 2024

Related U.S. Application Data (60) Provisional application No. 63/387,525, filed on Dec. 15, 2022.

(51) Int. Cl.
*H04L 9/40* (2022.01)
*H04L 67/02* (2022.01)

(52) U.S. Cl.
CPC ........ *H04L 63/0807* (2013.01); *H04L 63/083* (2013.01); *H04L 63/102* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 9,325,791 B1 * | 4/2016 | Blahaerath | H04L 43/08 |
| 9,565,190 B1 * | 2/2017 | Telvik | H04L 63/0807 |
| 10,768,985 B1 * | 9/2020 | Batsura | G06F 9/5011 |
| 11,196,748 B1 * | 12/2021 | Croney | H04L 63/102 |
| 11,405,360 B1 * | 8/2022 | Bose | H04L 63/0272 |
| 2011/0265147 A1 * | 10/2011 | Liu | H04L 67/306 726/4 |
| 2017/0171300 A1 | 6/2017 | Natarajan et al. | |
| 2017/0289128 A1 | 10/2017 | Kelley et al. | |
| 2018/0048636 A1 | 2/2018 | Anantha Padmanaban et al. | |
| 2020/0067933 A1 * | 2/2020 | Kukreja | H04L 63/104 |

(Continued)

OTHER PUBLICATIONS

International Search Report and Written Opinion of International Patent Application No. PCT/US2023/083956 dated on Apr. 5, 2024, 08 pages.

*Primary Examiner* — Lashonda Jacobs-Burton
(74) *Attorney, Agent, or Firm* — Michael Guthrie; Jeffrey D. Frantz (57) ABSTRACT

A method, computer system, and computer program product are provided for integrating access to multiple cloud storage sources from different applications. A storage account is joined to a local domain. The storage account is registered with a directory service in the local domain. A first service accesses the storage account by using a domain credential for accessing the local domain. A second service accesses the storage account by using a directory service credential to the directory service. The first service and the second service may concurrently access the storage account.

20 Claims, 4 Drawing Sheets

(56) References Cited

U.S. PATENT DOCUMENTS

| | | | |
|---|---|---|---|
| 2020/0304481 A1* | 9/2020 | Rathore | H04L 63/105 |
| 2020/0366661 A1* | 11/2020 | Mehta | H04L 63/107 |
| 2020/0409796 A1* | 12/2020 | Terei | G06Q 10/107 |
| 2020/0412736 A1 | 12/2020 | Kissell et al. | |
| 2021/0342196 A1* | 11/2021 | Natarajan | H04L 63/0807 |
| 2021/0377276 A1 | 12/2021 | Dasari et al. | |
| 2024/0080316 A1* | 3/2024 | Wong | H04L 9/0891 |

* cited by examiner

INTEGRATING DATA ACCESS AMONG DISPARATE PLATFORMS OVER A CLOUD STORAGE SCHEME

CROSS-REFERENCE TO RELATED APPLICATIONS

This application is a nonprovisional application of, and thereby claims benefit to, U.S. Provisional application 63/387,525 filed on Dec. 15, 2022, which is incorporated herein by reference in its entirety.

BACKGROUND

Cloud storage is a mode of computer data storage in which the digital data is stored on servers in off-site locations. Cloud-native storage systems have the servers and applications on the servers that host, manage, and store the data. The cloud-native storage system may be controlled by third-party providers. Cloud-native storage systems may not be fully compatible with user-accessible applications. Cloud-native storage systems manage data for multiple different customers. To manage the proprietary nature of the data, cloud-native storage systems isolate the data into separate domains, whereby each domain is an isolation container for data. To access data, an application provides the application's domain access credentials to authenticate itself to the domain.

BRIEF DESCRIPTION OF DRAWINGS

FIG. 4.1 and FIG. 4.2 show a computing system and network environment, in accordance with one or more embodiments.

Like elements in the various figures are denoted by like reference numerals for consistency.

DETAILED DESCRIPTION

In general, embodiments are directed to increasing access to a particular type of cloud storage by multiple disparate applications. One or more embodiments integrate a cloud storage system designed for use with a first service when using a second disparate application, when both services are in different domains. The first service accesses local domain storage using a domain controller for access. Using a different protocol, the second service accesses domain storage of the first service without joining the local domain.

Cloud-native storage systems may not be fully accessible with user-accessible applications. For example, a first service may have a different access control to data on a particular cloud storage type, but a second service may not be able to access the data using that access control. The result is isolated systems whereby the first service cannot access the data in the other domain. One or more embodiments provide a shared storage that allows multiple ways of access control to the same shared storage, so that different applications can use the shared storage seamlessly and together access the same data.

The illustrative embodiments provide a method, computer system, and computer program product, and for integrating access to multiple cloud storage sources from different applications. In one embodiment, a method includes joining a storage account to a local domain. The storage account is registered with a directory service in the local domain. A first service accesses the storage account by using a domain credential for accessing the local domain. A second service accesses the storage account by using a directory service credential to the directory service. The first service and the second service may concurrently access the storage account.

Figure 1:
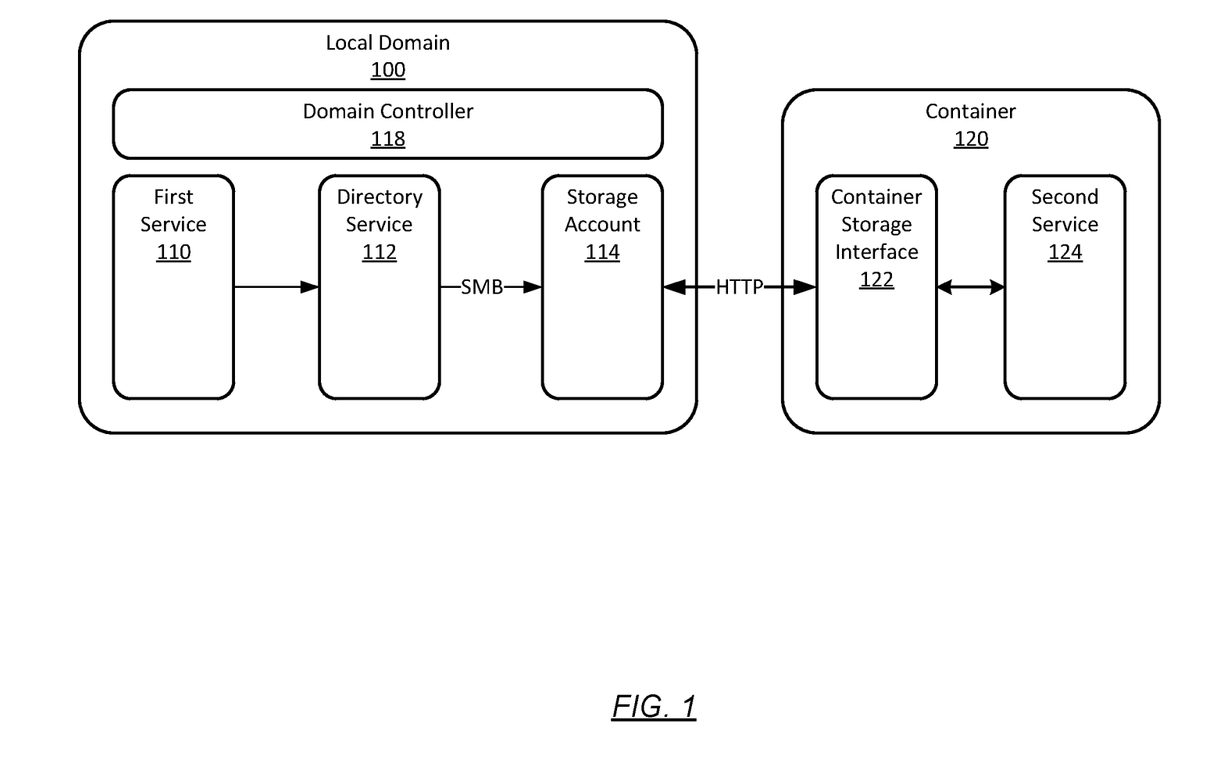
FIG. 1 shows a system for integrating access to cloud storage sources from different applications, in accordance with one or more embodiments.

FIG. 1 shows a system for integrating access to multiple cloud storage sources from multiple different services. Storage may join the local domain but also has access granted via a directory service credential as the storage is connected to the directory service as well. Service A may access using the domain credential as Service A is also connected to the local domain. But Service B, which is not connected to the local domain, can access the data using the directory service credential.

The local domain (100) is an organizational, managed network environment. The local domain may be a directory service domain. Within the local domain, resources such as user credentials, computer accounts, and permissions are centrally administered through a domain controller (118). The domain controller (118) enforces security policies, authenticates requests from entities within the domain, and ensures that only authorized users and services can access domain-joined resources. The domain controller (118) is typically found in on-premises infrastructures but can also be extended to cloud environments using services like Azure Active Directory Domain Services (AAD DS).

The local domain's structure may be hierarchical, allowing for intricate relationships and policy implementations across different organizational units, thereby enabling organizations to maintain established security protocols and management practices. The local domain (100) is configured to allow entities to join the domain. Joining a domain involves configuring the domain controller (118) to recognize and authenticate the service using credentials issued by the domain controller (118), thus permitting domain-joined entities to interact with the storage account (114).

The first service (110) is an enterprise application or other service within the local domain (100) that utilizes domain authentication mechanisms provided by the directory service (112). For example, the first service (110) can be a legacy system that uses domain credentials, such as username and password, for authentication and access control. The first service (110) communicates with network resources through protocols such as Server Message Block (SMB).

The directory service (112) is a program that manages security and access policies for resources and services within the local domain (100). For example, in one embodiment, the directory service (112) can be an Azure Active Directory. Other directory service programs may be used. The directory service utilizes the Lightweight Directory Access Protocol (LDAP) to facilitate communication between users and the domain services, and a Kerberos protocol to manage secure, ticket-based authentication. In addition to authentication, the directory service (112) authenticates the first service (110) using the SMB protocol to interact with the storage account (114).

The storage account (114) is a dedicated space within a cloud provider's environment allocated for storing data. The storage account (114) may store data such as files, blobs, queues, tables, and other types of data are held. The storage account may provide a unique namespace, such that data stored in the account is accessible over hypertext transfer protocol (HTTP) or hypertext transfer protocol secure (HTTPS) connections. Storage accounts joined to directory service inherit the domain's security and policy settings, allowing the domain's resources to be managed under a single unified framework. For legacy applications, such as the first service (110), the storage account (114) provides compatibility with the SMB protocol, enabling these applications to interact with the cloud storage as if the storage was a local file system.

In an embodiment, the data in a cloud storage accessible storage account (114) is made available to other services outside the local domain (100), with the data still being locally available to the first service (110) inside the local domain (100) (i.e., the application that was originally intended to access a given cloud storage source). The accessibility may be done by providing a service message block (SMB) protocol support with the local directory service (112), and at the same time the other services use a container storage interface (122) driver using a second account credential to access the directory service (112).

The container (120) is a containerized workload housing a lightweight, standalone, executable package of software. The container (120) includes everything needed to run a piece of software, such as the code, a runtime, libraries, environment variables, and configuration files. The container (120) can be deployed within an orchestrated environment, such as Kubernetes, which abstracts the underlying infrastructure and automates application deployment, scaling, and management.

The container storage interface (CSI) (122) is a standard for exposing storage systems to containerized workloads on container orchestration systems such as Kubernetes, providing an abstraction layer that enables cloud-native storage consumption. The container storage interface (CSI) provides the hooks that allow containers to connect to and use the storage account (114). The CSI driver is responsible for translating application programming interface (API) calls from the container orchestrator, enabling dynamic provision, mounting, and lifecycle management of persistent storage.

The second service (124) is a cloud-native application that operates within the container environment of the container (120), separate from the local domain (100). The second service is designed to work with modern cloud paradigms, leveraging managed identities for authentication, and communicating with cloud services over secure HTTP/HTTPS protocols. The second service is engineered to be stateless, scalable, and resilient, characteristics that are emblematic of cloud-native applications. The second service can be a microservice in a larger cloud application, a standalone API, or a backend service for a frontend web application or mobile app.

Unlike the first service (110), the second service (124) accesses the storage account (114) via a managed identity, which may be configured with the precise permissions used to perform the operations of the second service. For example, the second service (124) may utilize Azure AD's OAuth 2.0 tokens for authentication that does not require server-to-server trust relationships.

Figure 2:
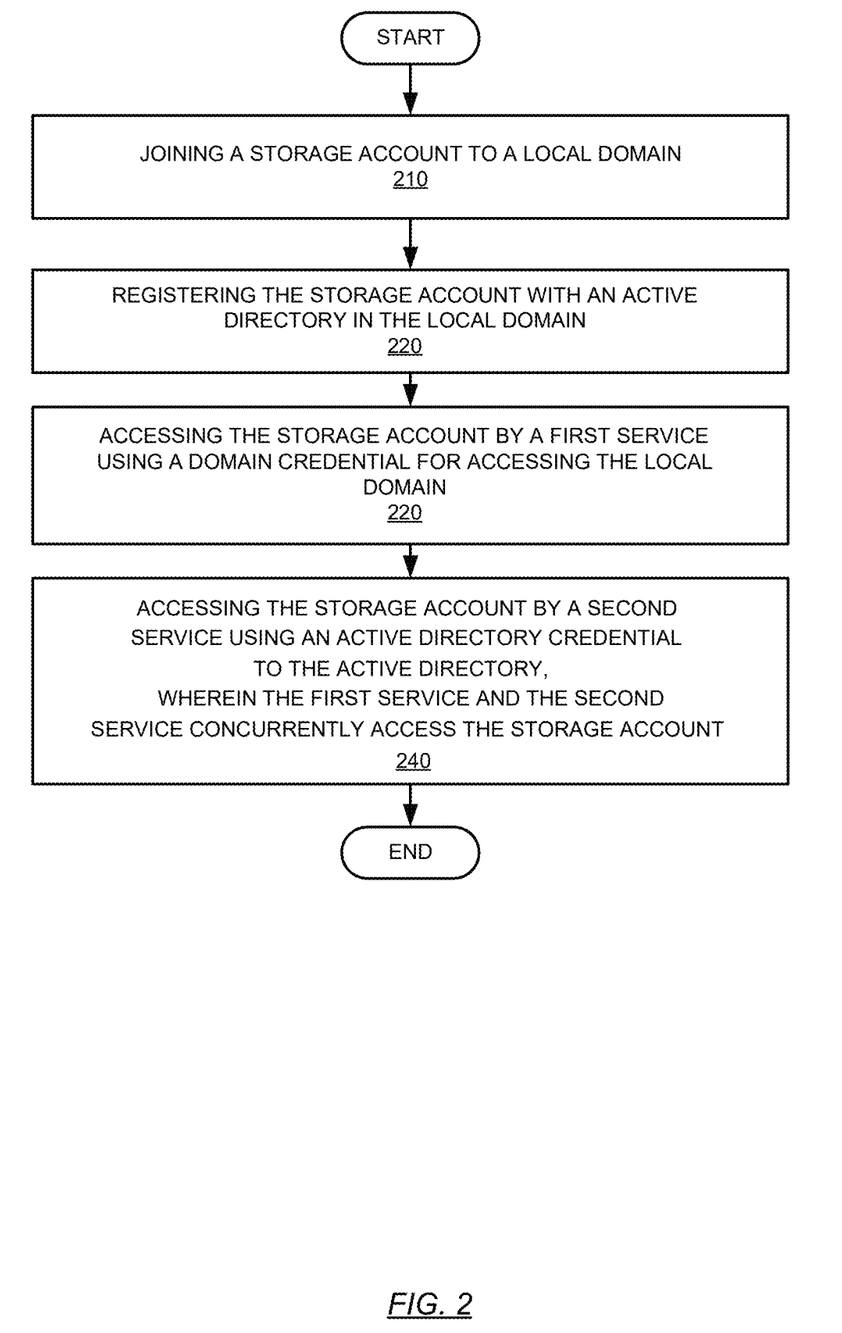
FIG. 2 is a flowchart, in accordance with one or more embodiments.

FIG. 2 shows a flowchart for accessing cloud storage via different application types, in accordance with one or more embodiments. The process illustrated in FIG. 2 can be implemented in one or more components of FIG. 1.

At Block (210), a storage is joined to a local domain. To join a storage solution to a local domain, the process begins with the configuration of the storage system to integrate with the directory service. For example, integration may be achieved by deploying Microsoft Active Directory, which provides a managed domain and facilitates a trust relationship with directory services. Once Active Directory is enabled and configured, the storage account is joined to the domain by setting the appropriate domain parameters and using the Active Directory portal or automation scripts to complete the join operation. The storage system is then able to use the Active Directory for authentication and authorization of access requests.

At Block (220), the storage account is registered with a directory service in the local domain. In some embodiments, registering the storage account may involve creating a service account within the directory service that possesses specific permissions to the storage. The creation of the storage account can be managed through the directory service administrative tools, where a unique service account is provisioned with access credentials (e.g., username and a password satisfying predefined rules). After creation, the service account is assigned permissions to interact with the storage solution. Permissions may be managed within the Azure portal, where access controls are defined, and the service account is granted the appropriate level of access by assigning the service account to a role with the necessary permissions, ensuring adherence to the principle of least privilege.

At Block (230), the storage account is accessed by a first service using a domain credential for accessing the local domain. In some embodiments, accessing the storage using a domain credential may entail the application being configured to authenticate using the service account credentials provided by the directory service. The first service uses the account credentials to authenticate against the local domain. Once authenticated, the first service is authorized to access the storage system based on the permissions assigned to the service account. This domain-based authentication ensures that only applications with valid domain credentials may access the storage resources.

At Block (240), the storage is accessed by a second service using a second directory service credential to the directory service. The second service is not connected to the local domain. For example, the second service does not have a domain credential to the local domain. The first service and the second service may concurrently access the storage.

For the second service, which does not connect to the local domain, access to the storage account is granted using a second directory service credential provided by the domain controller. In some embodiments, the second directory service credential is a managed identity specifically for use with cloud-native services. The managed identity is configured to authenticate directly with the directory service, bypassing the need for domain join. The second service utilizes token-based authentication to securely obtain security tokens, which are then used to access the storage account within the local domain. The security tokens provide proof of identity and authorization without the need for the application to be part of the local domain of the directory service.

In scenarios where the first service and the second service need concurrent access to the storage, the system may employ a concurrency management mechanism to manage access. The storage system uses locking mechanisms and security tokens to coordinate concurrent operations, ensuring data integrity and preventing access conflicts. The locking mechanism allows both services, regardless of their domain association, to access and operate on the storage system simultaneously without interference, with each application's access being governed by the specific credentials and permissions that have been granted to the service.

While the various Blocks in flowcharts described herein are presented and described sequentially, at least some of the Blocks may be executed in different orders, may be combined, or omitted, and at least some of the Blocks may be executed in parallel. Furthermore, the Blocks may be performed actively or passively.

Figure 3:
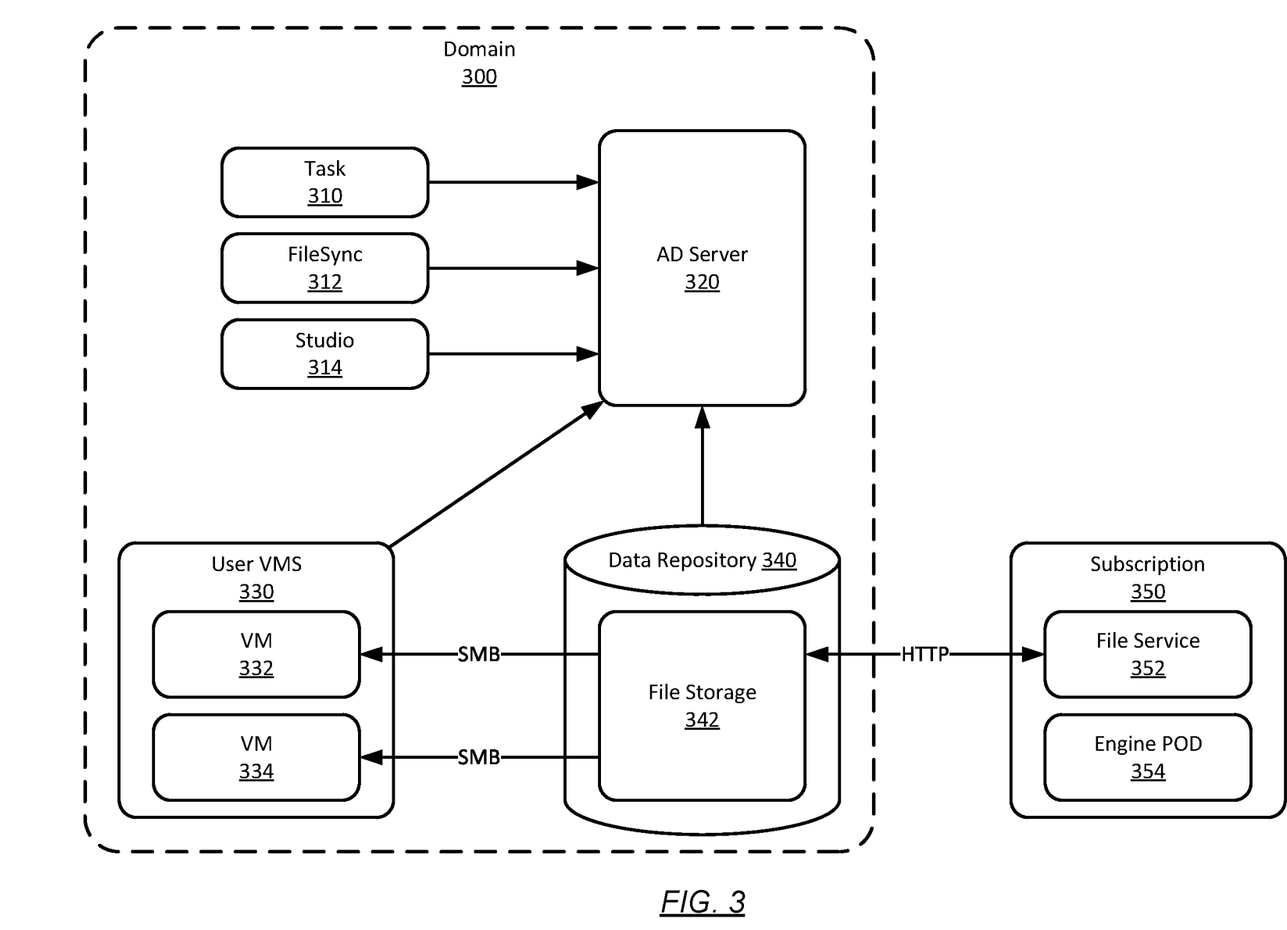
FIG. 3 shows an example of an architecture for accessing cloud storage via different application types, in accordance with one or more embodiments.

FIG. 3 shows a specific example of integrating access to multiple cloud storage sources one or more embodiments, according to illustrative embodiments. The example illustrated in FIG. 3 provides additional details of the system described in FIG. 1. The one or more embodiments are not necessarily limited to the example illustrated in FIG. 3.

FIG. 3 shows a hybrid cloud setup that integrates a customer's local directory service with extra-domain services, allowing a storage account to be shared between the customer's subscription and an external service subscription. In particular, FIG. 3 shows how data within one domain, which is integrated with a petrochemical suite directory service, may be accessed by another customer subscription for the other application service, which uses the container storage interface driver to access the same data. Users may then use shared storage to share data.

In the described architecture, consider a use case scenario where a company, "ABC Corp," has a local domain setup for its on-premises infrastructure and also utilizes cloud services for some of its operations. ABC Corp has a team of software developers and a data analysis department that need to concurrently access a set of files stored in File Storage (342).

The directory service domain (300) encapsulates the on-premises or cloud-native directory services environment where the directory service server (320) resides. The domain contains assorted services and components that rely on AD for authentication and authorization, such as task (310), file sync (312), and studio (314). The task (310) represents a scheduled or automated service that requires domain authentication to perform operations, such as batch jobs or maintenance scripts. File sync (312) may be a service designed for synchronizing files across different systems or locations within the domain. The studio (314) is a development or content creation environment that requires access to the domain for resource management and collaboration.

Continuing with the current example, the software development team at ABC Corp uses studio (314), an integrated development environment (IDE) that is domain-joined and requires access to various source code files, libraries, and documentation stored within file storage (342). When a developer initiates a build process or tries to fetch the latest code, the studio (314) communicates with the directory service server (320) to authenticate the developer's domain credentials.

The directory service server (320) manages security policies, authenticates, and authorizes users and services within the domain (300). The directory service server (320) is the domain controller responsible for authentication and access control within the customer's subscription. Within domain (300), access control is managed through the domain controller, requiring entities to be part of the local domain.

Upon successful authentication of the ABC Corp developer, the Studio (314) uses the SMB protocol to access the necessary files from File Storage (342). The File Storage (342) is a component of the Data Repository (340), representing the file storage system where files and documents are kept. The File Storage (342) is accessible via the SMB protocol for services within the local Domain (300). File Storage (342) is a domain-isolated data storage solution that is connected to a local directory service of deployment domain (300).

Data repository (340) serves as a centralized storage system, which could be a database or a file storage system, which stores data used by services within the local domain (300). In one or more embodiments, the data repository (340) may be a type of storage unit and/or device (e.g., a file system, database, data structure, or any other storage mechanism) for storing data. Further, the data repository may include multiple different, potentially heterogeneous, storage units and/or devices. The data repository may be characterized as a non-transitory computer readable storage medium.

User virtual machines (VMs) (330), including virtual machine (VM) (332) and VM (334), are virtual machines that execute one or more services within the domain (300) that access file storage (342), which is an example of a storage account (114) of FIG. 1. These VMs are authenticated and managed by the directory service server (320). An SMB driver is employed on the virtual machine for accessing File Storage (342).

Continuing with the current example, ABC Corp's data analysis department needs to perform data analytics on data in file storage (342). Storage (342).

Subscription (350) represents the cloud-native environment, such as Azure, which contains services that are not necessarily domain-joined but require access to the File Storage (342). The data analysis department uses Engine POD (354), which runs in a containerized environment as part of Subscription (350). The Engine POD (354) uses file service (352) to access file storage (342).

Subscription (350) is a service for high-performance computing (HPC) workloads running on Kubernetes. Subscription (350) accesses the File Storage (342) via the CSI driver using service accounts registered with the cloud-native environment for identity and access management, bypassing the need to join the domain.

File Service (352) is a cloud service that allows cloud-native applications to access the Data Repository (340). File Service (352) may use authentication methods, such as OAuth, and accesses data over HTTP/HTTPS. File Service (352) uses a file service layer, leveraging identity management of the cloud-native services, to access file storage (342) over HTTP/HTTPS without joining domain (300). The file service (352) is cloud native and managed by a cloud-native service (e.g., AZURE®).

File Service (352) interacts with Azure's identity management to authenticate the Subscription (350) using a service account that has been granted the appropriate permissions. Once authenticated, the file service (352) uses HTTP/HTTPS protocols to retrieve and store data from File Storage (342). This process allows the data analysts to run large-scale computations and store the results back into the file storage (342) without directly interacting with the local domain.

Engine POD (354) is a containerized application, possibly part of a Kubernetes cluster, which performs computational tasks or runs applications. Engine POD (354) accesses the File Storage (342) via the File Service (352), which translates and forwards file operations between the Engine POD (354) and File Storage (342). When a request is made by Engine POD (354), File Service (352) dynamically picks which file storage to access, based on the request specifics. This process involves creating computing resources on demand, and mounting data repository (340). After fulfilling a request, file service (352) automatically unmounts the data repository (340) and moves on to the next request, releasing these resources upon completion of the computation task.

The system illustrated in FIG. 3 simplifies data accessibility for other platforms outside domain (300), maintaining data within the deployment using directory service access. The system uses two different drivers, with intra-domain platforms able to access data within the deployment via the directory service and Azure File Share (AFS)'s SMB Protocol support. Extra-domain platforms are able to access data via a CSI driver using a transfer protocol, such as HTTPS (Hypertext Transfer Protocol Secure), Thus, both intra-domain services and extra-domain may read and write to the same file seamlessly, establishing a producer-consumer relationship.

The one or more embodiments enables efficient and seamless data access for assorted services, including HPC workloads. The one or more embodiments allow customers to run the different application service workflows directly on the petrochemical suite storage without transferring data or having domain trust. The system enhances data handling efficiency, reduces the need for data replication, and streamlines operations across different tenants and domains. Thus, one or more embodiments may be more efficient than the existing domain-based access control and modern cloud-native identity management.

The one or more embodiments make the data available to other platforms, while the data is still available inside the deployment using a directory service access. The one or more embodiments help other platforms (applications) to run the workflows directly via a CSI driver using a transfer protocol, such as HTTPS (Hypertext Transfer Protocol Secure), on the data, which is stored in the cloud file share, instead of copying or moving the data outside of the local domain and then running the workflow.

The one or more embodiments facilitate a producer-consumer relationship where both the customer's internal services and the external services may function as producers or consumers of data, depending on the workflow requirements. It addresses the inefficiencies associated with data duplication and transfer, leading to a more streamlined and cost-effective process for managing high-performance computing workloads.

The one or more embodiments may integrate the petrochemical suite Active Directory, which may be on a Windows® virtual machine with an AZURE® file share. Publicly available information may prompt integrating the AZURE® Active Directory with an AZURE® file share, e.g., via a uniform resource link (URL). Other cloud-native platforms may be used, in addition to AZURE®.

The one or more embodiments may make data from one domain accessible outside that domain without domain authentication by integrating a directory service with a file share and using a container storage interface driver with a protocol (e.g., HTTPS). In other words, the data from a local domain becomes accessible via container storage interface driver to another application via a transfer protocol (e.g., HTTPS). As shown, data sharing is accomplished without having to integrate back with the directory service.

This approach may streamline data access across domains without domain authentication, leveraging the cloud-native file share and CSI driver. The approach may be applicable to any service that relies on access to the file share storage from outside the tenant. A similar approach may be used to share the data from the petrochemical suite to other platforms without transferring data to other applications in different or same subscriptions. The one or more embodiments may help integrate multiple services which reside outside of a domain, with or without integration of a directory service.

Thus, the one or more embodiments relate to integrating a file share service with the directory service, based on a virtual machine directory service. Then, data is accessed in the file share, which may be mounted as a network drive on the virtual machine via the container storage interface driver using a HTTPS protocol, without having to use the directory service of the local domain. Thus, using one or more embodiments, the data which resides in one tenant may be accessed by other applications without using the trusted domain access for applications. Accordingly, data may be transferred much more quickly across different applications and different cloud-native storage services.

While the figures may show a configuration of components, other configurations may be used without departing from the scope of one or more embodiments. For example, various components may be combined to create a single component. As another example, the functionality performed by a single component may be performed by two or more components.

Embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure.

Figure 41:
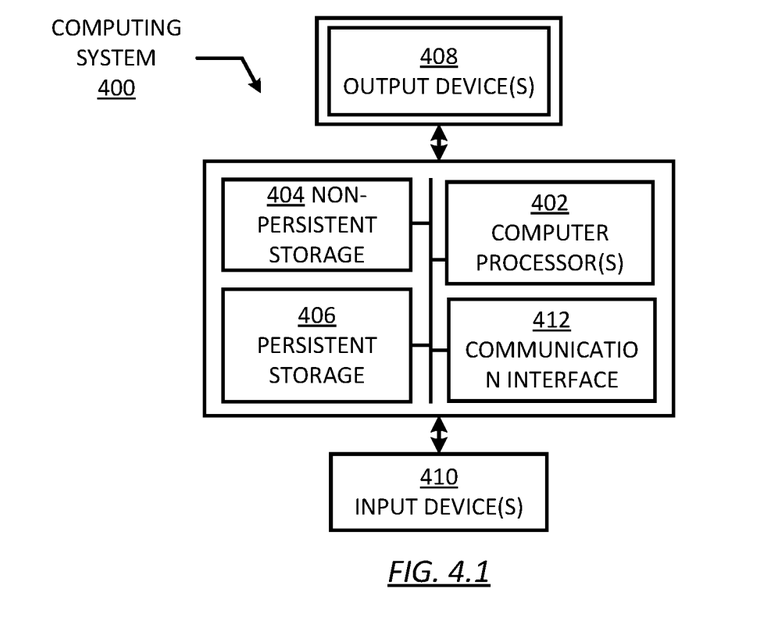

For example, as shown in FIG. 4.1, the computing system (400) may include one or more computer processors (402), non-persistent storage (404), persistent storage (406), a communication interface (412) (e.g., Bluetooth interface, infrared interface, network interface, optical interface, etc.), and numerous other elements and functionalities that implement the features and elements of the disclosure. The computer processor(s) (402) may be an integrated circuit for processing instructions. The computer processor(s) may be one or more cores or micro-cores of a processor. The computer processor(s) (402) includes one or more processors. The one or more processors may include a central processing unit (CPU), a graphics processing unit (GPU), a tensor processing unit (TPU), combinations thereof, etc.

The input devices (410) may include a touchscreen, keyboard, mouse, microphone, touchpad, electronic pen, or any other type of input device. The input devices (410) may receive inputs from a user that are responsive to data and messages presented by the output devices (408). The inputs may include text input, audio input, video input, etc., which may be processed and transmitted by the computing system (400) in accordance with the disclosure. The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the output devices (408) may include a display device, a printer, external storage, or any other output device. One or more of the output devices may be the same or different from the input device(s). The input and output device(s) may be locally or remotely connected to the computer processor(s) (402). Many diverse types of computing systems exist, and the aforementioned input and output device(s) may take other forms. The output devices (408) may display data and messages that are transmitted and received by the computing system (400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 42:
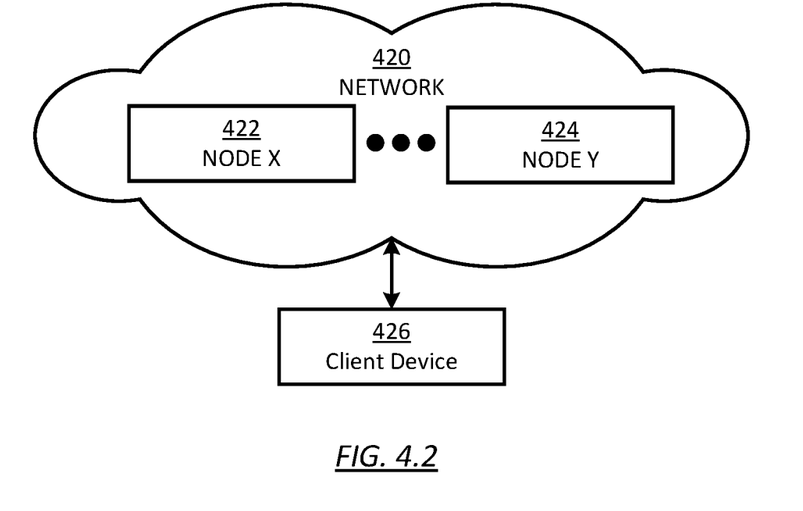

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

The nodes (e.g., node X (422), node Y (424)) in the network (420) may be configured to provide services for a client device (426), including receiving requests and transmitting responses to the client device (426). For example, the nodes may be part of a cloud computing system. The client device (426) may be a computing system, such as the computing system shown in FIG. 4.1. Further, the client device (426) may include and/or perform at least a portion of one or more embodiments.

The computing system of FIG. 4.1 may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of robotic path trajectory or sensor package determination systems. The various elements, systems, components, and blocks shown in the figures may be omitted, repeated, combined, and/or altered as shown from the figures. Accordingly, the scope of the present disclosure should not be considered limited to the specific arrangements shown in the figures.

The various descriptions of the figures may be combined and may include or be included within the features described in the other figures of the application. The various elements, systems, components, and Blocks shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

The description provides extensive details to ensure a complete understanding of the disclosure. However, those with expertise in the field may implement the technology without adhering strictly to these particulars. Additionally, to maintain clarity, certain common features are not exhaustively discussed. Further, other embodiments not explicitly described above may be devised which do not depart from the scope of the claims as disclosed herein.

What is claimed is:

1. A method comprising:
    joining a storage account to a local domain;
    registering the storage account with a directory service in the local domain;
    accessing the storage account by a first service using a domain credential for accessing the local domain; and
    accessing the storage account by a second service using a directory service credential to the directory service,
    wherein the first service and the second service concurrently access the storage account.

2. The method of claim 1, wherein joining the storage account to the local domain further comprises:
    configuring the storage account to communicate with the directory service.

3. The method of claim 1, wherein registering the storage account with the directory service further comprises:
    creating a service account within the directory service that has been granted one or more permissions to the storage account.

4. The method of claim 1, wherein the storage account is an Azure Storage account.

5. The method of claim 1, wherein accessing the storage account by the first service further comprises:
    authenticating the first service with the local domain using a Kerberos protocol.

6. The method of claim 1, wherein accessing the storage account by the first service further comprises:
accessing the storage account via a Server Message Block driver over a Server Message Block protocol connection.

7. The method of claim 1, wherein the first service is running on a virtual machine within the local domain.

8. The method of claim 1, wherein the second service is a cloud-native service running in a containerized environment.

9. The method of claim 1, wherein accessing the storage account by the second service further comprises:
obtaining, by the second service, a security token from Azure Active Directory; and
presenting, by the second service, the security token to access the storage account.

10. The method of claim 1, wherein the directory service credential used by the second service is a managed identity that is not joined to the local domain.

11. The method of claim 1, wherein accessing the storage account by the second service further comprises:
accessing the storage account via a container Storage Interface driver over a Hypertext Transfer Protocol Secure connection.

12. The method of claim 1, wherein the concurrent access by the first service and the second service further comprises:
coordinating concurrent access by a concurrency management mechanism within the storage account.

13. A system comprising:
a computer processor; and
a non-transitory computer readable storage medium storing program code, which when executed by the computer processor, performs a plurality of operations comprising:
joining a storage account to a local domain;
registering the storage account with a directory service in the local domain;
accessing the storage account by a first service using a domain credential for accessing the local domain; and
accessing the storage account by a second service using a directory service credential to the directory service,
wherein the first service and the second service concurrently access the storage account.

14. The system of claim 13, wherein joining the storage account to the local domain further comprises:
configuring the storage account to communicate with an Active Directory Domain Services instance; and
wherein registering the storage account with the directory service further comprises:
creating a service account within the directory service that has been granted one or more permissions to the storage account.

15. The system of claim 13, wherein accessing the storage account by the first service further comprises:
authenticating the first service with the local domain using a Kerberos authentication protocol; and
accessing the storage account via a Server Message Block driver over a Server Message Block protocol connection.

16. The system of claim 13, wherein the first service is running on a virtual machine within the local domain.

17. The system of claim 13, wherein the second service is a cloud-native service running in a containerized environment.

18. The system of claim 13, wherein accessing the storage account by the second service further comprises:
obtaining, by the second service, a security token from Azure directory service via an OAuth authentication; and
presenting, by the second service, the security token to access the storage account.

19. The system of claim 13, wherein the directory service credential used by the second service is a managed identity that is not joined to the local domain; and
wherein accessing the storage account by the second service further comprises:
accessing the storage account via a container Storage Interface driver over a Hypertext Transfer Protocol Secure connection.

20. A computer program product comprising a non-transitory computer readable storage medium storing program code, which when executed by a computer processor, performs a plurality of operations comprising:
joining a storage account to a local domain;
registering the storage account with a directory service in the local domain
accessing the storage account by a first service using a domain credential for accessing the local domain; and
accessing the storage account by a second service using a directory service credential to the directory service,
wherein the first service and the second service concurrently access the storage account.

* * * * *